US005336129A

United States Patent [19]
Frith

[11] Patent Number: 5,336,129
[45] Date of Patent: Aug. 9, 1994

[54] DEVICE FOR HANDLING AND PREPARING GAME ANIMALS

[76] Inventor: Walter Frith, 12742 Liberty Cir., Duncanville, Ala. 35456

[21] Appl. No.: 130,792
[22] Filed: Oct. 4, 1993
[51] Int. Cl.5 ............................................. A22B 5/16
[52] U.S. Cl. ................................................. 452/187
[58] Field of Search ........................ 452/185, 187, 190

[56] References Cited
U.S. PATENT DOCUMENTS

| 4,317,257 | 3/1982 | Engel | 452/187 |
| 4,529,240 | 7/1985 | Engel | 452/187 |
| 4,543,688 | 10/1985 | Barchus | 452/125 |
| 4,625,363 | 12/1986 | Watson | 452/187 |
| 4,782,557 | 11/1988 | Gladney et al. | 452/187 |

Primary Examiner—Willis Little
Attorney, Agent, or Firm—Hugh E. Smith

[57] ABSTRACT

A device for removing the hide from a carcass of an animal comprising a base plate including a clamping hole disposed thereon, means for securing a cable thereto, a notch disposed thereon for guiding the cable away from the securement means, and means for securing the hide to an externally positioned and prepared animal carcass through the clamping hole of the base plate, so that when the cable is pulled, the hide is torn away from the carcass.

4 Claims, 4 Drawing Sheets

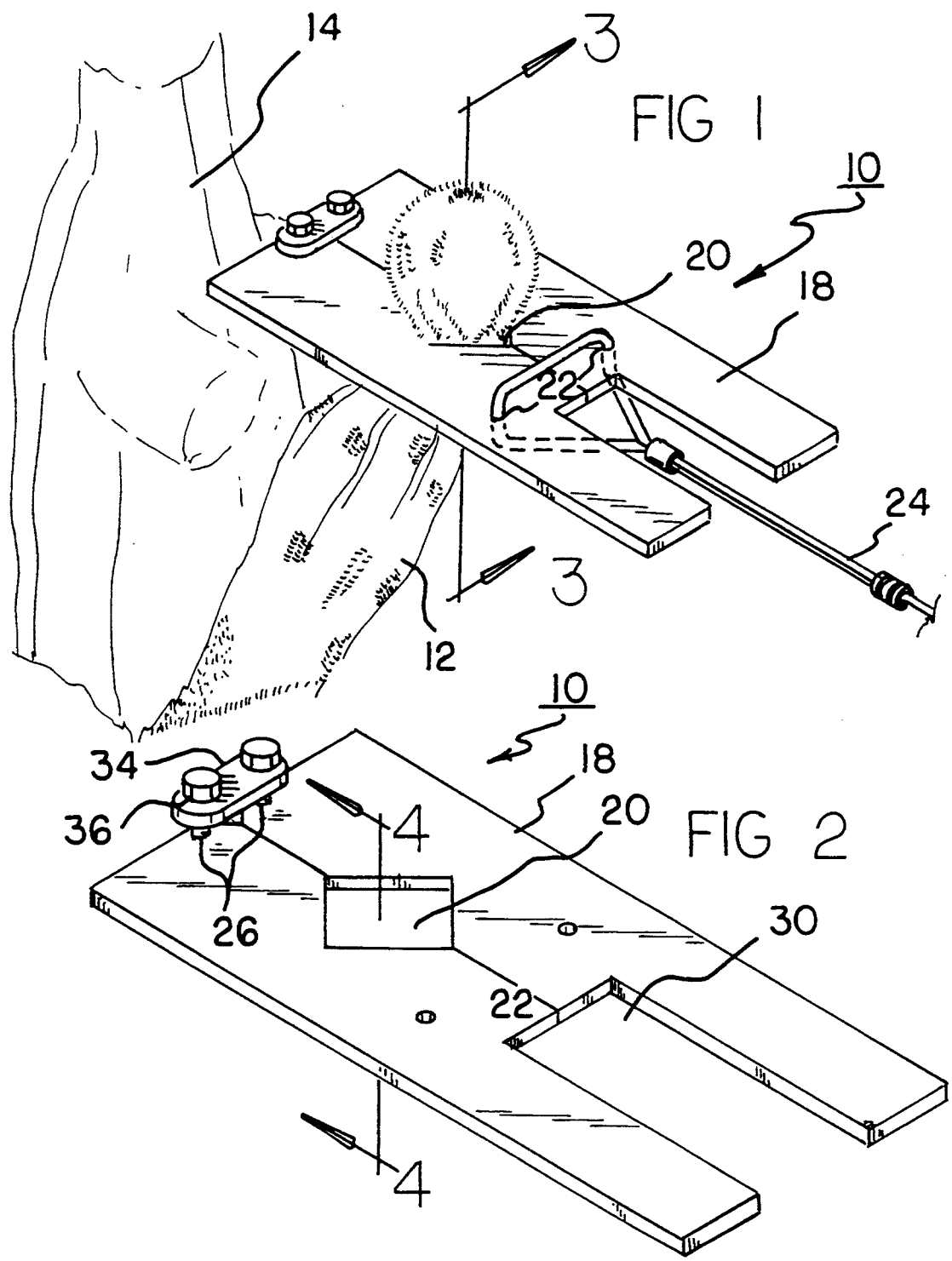

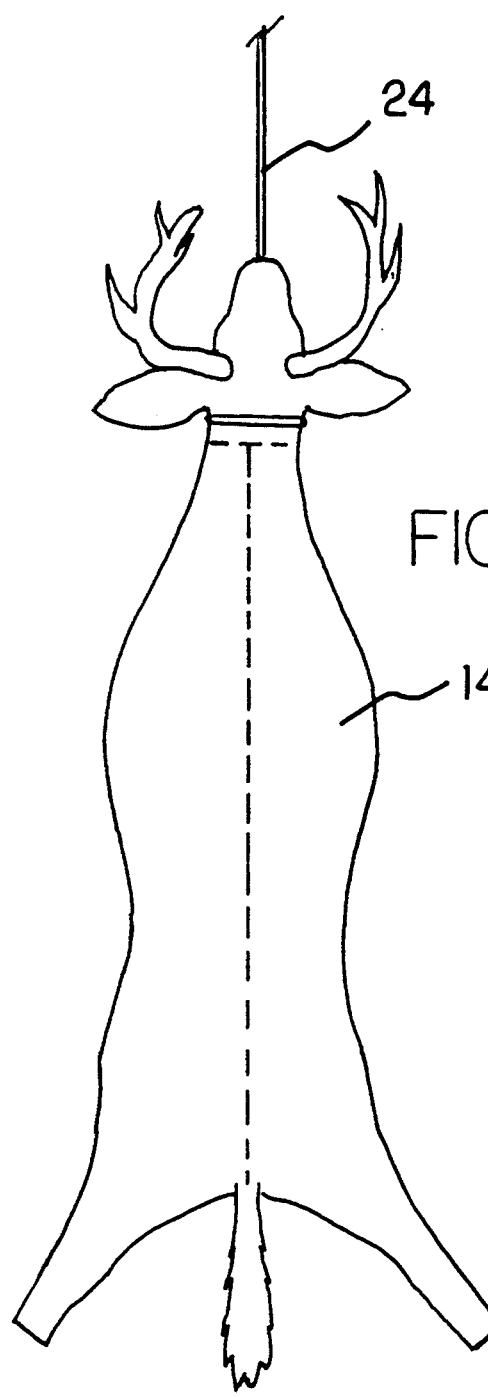
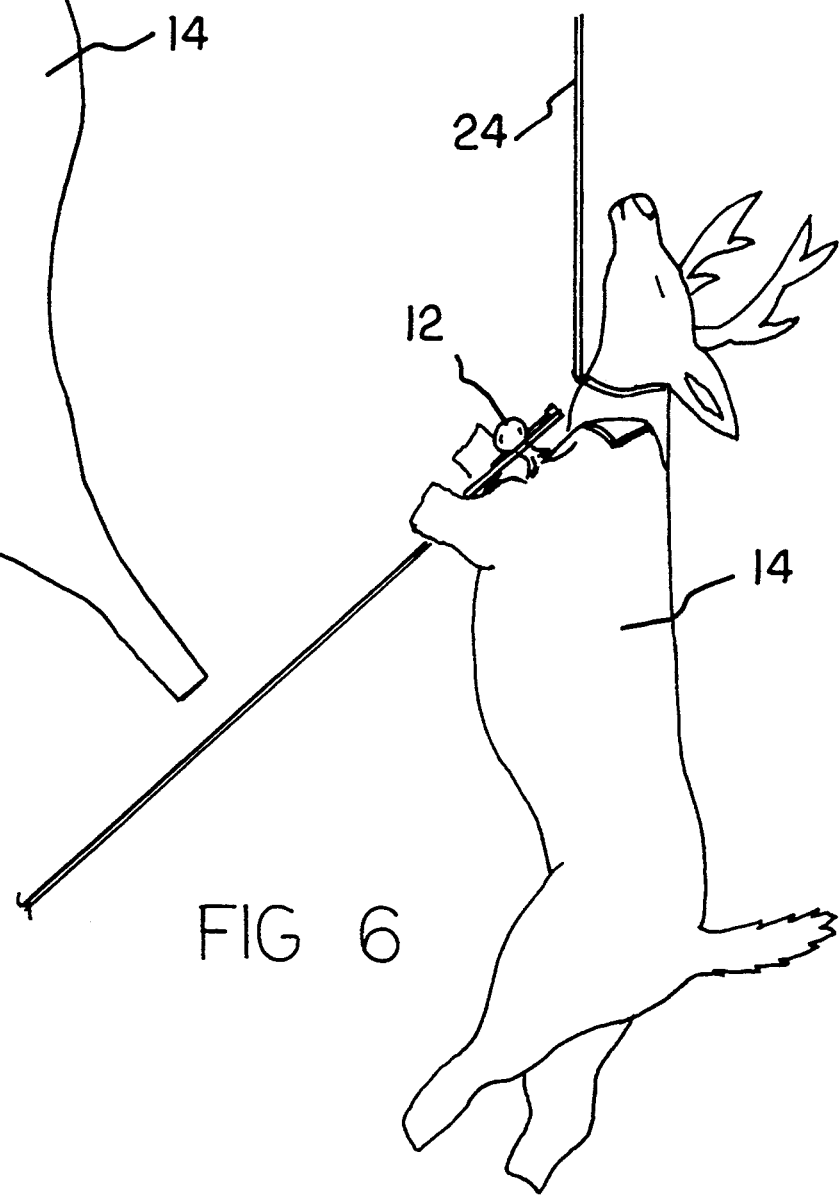

DEVICE FOR HANDLING AND PREPARING GAME ANIMALS

BACKGROUND OF THE INVENTION

1. Field of the Invention

The present invention relates to devices for handling and preparing game animals and more particularly pertains to devices which may be used to remove the hide from game animals.

2. Description of the Prior Art

The use of devices for handling and preparing game animals is known in the prior art. More specifically, devices heretofore devised and utilized for the purpose of handling and preparing game animals are known to consist basically of familiar, expected and obvious structural configurations, notwithstanding the myriad of designs encompassed by the crowded prior art which have been developed for the fulfillment of countless objectives and requirements.

For example, a sportsman's game and fish cleaning station illustrated in U.S. Pat. No. 4,930,188 to Hyde includes an aluminum support bar for suspending game to be cleaned. A clamping system forcibly sandwiches at least a portion of a game animal to be cleaned or skinned to the bar.

A portable small game holder as described in U.S. Pat. No. 4,581,790 to Horvath is a device having two flat rectangular plate arms joined by a hinge, the outer ends containing a slot into which the carcass of a game animal is fitted. A collapsible dressing hook for animals is described in U.S. Pat. No. 4,027,357 to Morris.

Other relevant patents include U.S. Pat. Nos. 4,502,41 to Runyan and 5,050,409 to Allamanche.

None of the devices, however, eliminate the strain of pulling and tugging to separate the hide from the carcass, the use of handling a sharp knife when separating the hide from the carcass, or the possibility of placing loose animal hair on the meat while removing the hide from the carcass, or cut skinning time by at least 75 percent.

In this respect, the present invention substantially departs from the conventional concepts and designs of the prior art, and in so doing provides an apparatus primarily developed for the purpose of removing the hide from a carcass of an animal.

Therefore, it can be appreciated that there exists a continuing need for new and improved device which can be used to remove the hide from the carcass of an animal. In this regard, the present invention substantially fulfills this need.

SUMMARY OF THE INVENTION

In view of the foregoing disadvantages inherent in the known types of devices for handling and preparing game animals now present in the prior art, the present invention provides a device wherein the same can be utilized for removing the hide from a carcass of an animal. As such, the general purpose of the present invention, which will be described subsequently in greater detail, is to provide a new device for removing the hide of an animal which is not anticipated, rendered obvious, suggested, or even implied by any of the prior art devices, either alone or in combination thereof.

To attain this, the present invention essentially comprises device for removing the hide from a carcass of an animal comprising a rectangular metal base plate formed of two similarly shaped halves and having a front face, a back face, a leading edge, a trailing edge, two side edges, and a central axis defined from the leading to trailing edge of the base plate, the base plate further including an essentially square clamping hole disposed thereon with the clamping hole having two corners aligned along the central axis, first and second cable receiving holes disposed thereon between the clamping hole and the leading edge of the base plate with the cable receiving holes symmetrically aligned with the central axis and adapted to receive a cable, two guiding holes disposed thereon between the trailing edge of the base plate and the clamping hole with the guiding holes symmetrically aligned with the central axis, and a rectangular notch disposed thereon adjacent to the leading edge and symmetrically aligned with the central axis with the notch adapted to guide a cable disposed through the cable receiving holes along an axis that is essentially planar with the central axis; a pair of essentially rectangular guiding plates having a trailing edge, a leading edge, two side edges, and two guiding holes disposed thereon, the guiding plate having a length such that the distance between its trailing edge and leading edge is less than the distance between the trailing edge of the base plate and the corner of the clamping hole adjacent to the trailing edge of the base plate and having a width such that the distance between its side edges is less than the distance between the side edges of the base plate, the guiding holes of the guiding plate and the guiding holes of the base plate having a common axis of symmetry; two guiding bolts with cooperative nuts, each bolt disposed through a guiding hole of the base plate and a guiding hole of the guiding plate and fastened with a nut, coupling the guiding plate to the front face of the base plate to define a guiding space therebetween, whereby a cable is routed through a cable receiving hole of the base plate from the back to the front face, positioned in the guiding space, routed through the other cable receiving hole of the base plate from the front to the back face, then externally secured; and an essentially spherical ball having a diametric dimension greater than the smallest cross dimension of the clamping hole and adapted to be encompassed with the exposed hide from around an animal's neck, the hide from around the neck being exposed by hanging the animal in an essentially upright position, cutting the hide from around the neck, cutting the hide down the back from the neck to below the animal's hams, then pulling downward, the hide from the carcass being exposed and removed by inserting the hide and ball through the clamping hole of the base plate from the back to the front face, and pulling the base plate with a cable, wedging the hide between the ball and a corner of the clamping hole, particularly the hide in the corner of the clamping hole aligned along the central axis and adjacent to the trailing edge of the base plate.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved device for handling and preparing game animals which has all the advantages of the prior art devices of a similar nature and none of the disadvantages.

It is another object of the present invention to provide a device for removing the hide of a carcass of an animal which may be easily and efficiently manufactured and marketed.

It is a further object of the present invention to provide a device for removing the hide of a carcass of an animal which is of a durable and reliable construction.

An even further object of the present invention is to provide a new and improved device for handling and preparing game animals which is susceptible of a low cost of manufacture with regard to both materials and labor, and which accordingly is then susceptible of low prices of sale to the consuming public, thereby making such devices economically available to the buying public.

Still yet another object of the present invention is to provide a new and improved device which provides in the apparatuses and methods of the prior art some of the advantages thereof, while simultaneously overcoming some of the disadvantages normally associated therewith.

Still another object of the present invention is to provide a new and improved device for removing the hide from a carcass of an animal comprising a base plate further including, a clamping hole disposed thereon, means for securing a cable thereto, a notch disposed thereon for guiding the cable away from the securement means, and means for securing the hide to an externally positioned and prepared animal carcass through the clamping hole of the base plate, so that when the cable is pulled, the hide is torn away from the carcass.

Yet another object of the present invention is to provide a new device that eliminates the extensive use of handling a sharp knife when separating the hide from the carcass.

Even still another object of the present invention is to provide a new device that lessens the possibility of contaminating the meat when removing during hide removal, cuts hide removal time by 75 percent, and makes hide removal a one-man operation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a perspective view of a device in use illustrating, the first embodiment of the invention.

FIG. 2 is an exploded perspective view of the components comprising the first embodiment of the invention as seen in FIG. 1.

FIG. 5 is view of the prepared animal before applying the device of the present invention.

FIG. 6 is a view of the animal coupled to the device of the present invention.

DESCRIPTION OF THE PREFERRED EMBODIMENT

Figure 3:
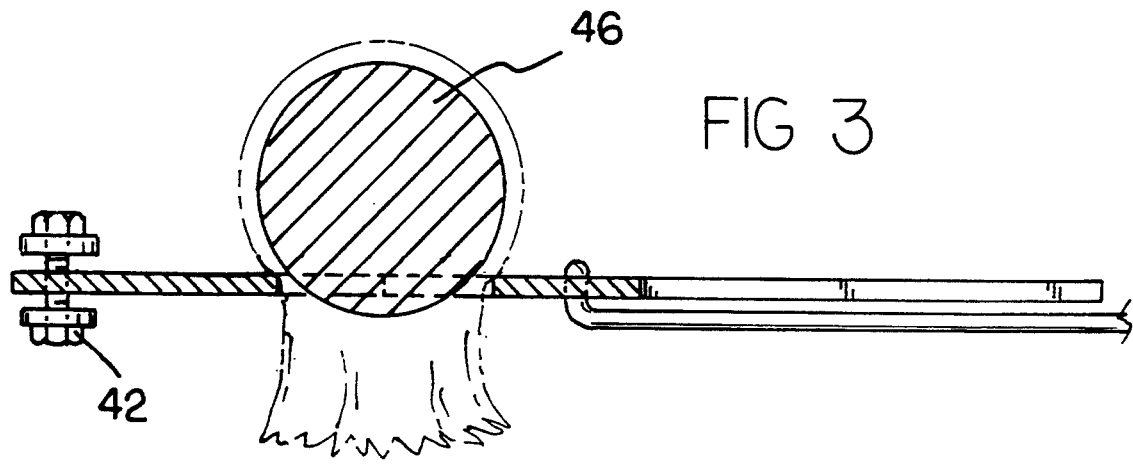
FIG. 3 is a cross sectional view of a portion of the device of the prior Figures taken along line 3—3 of FIG. 1.
Figure 4:
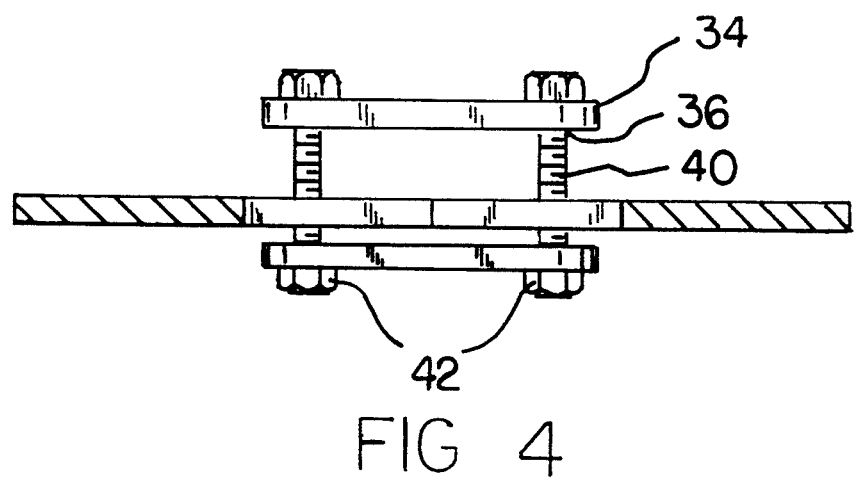
FIG. 4 is a cross sectional view of a portion of the device of the prior Figures taken along line 4—4 of FIG. 2.

With reference now to the drawings, and in particular to FIG. 1 thereof, a new device for removing the hide from a carcass of an animal embodying the principles and concepts of the present invention and generally designated by the reference numeral 10 will be described.

More specifically, the device 10 as shown in FIGS. 1 and 2 is constructed in accordance with the principles of the present invention and represents the primary embodiment of the invention. It is designed for removing the hide 12 from a carcass of an animal 14. It comprises a plurality of component elements including a rectangular metal base plate 18 having a front face, a back face, a leading edge, a trailing edge and two side edges. It has a central axis extending from the leading to trailing edge of the base plate 18. The base plate further includes an essentially square clamping hole 20 disposed thereon with the clamping hole having two corners aligned along the central axis. The base plate 18 further includes first and second cable receiving holes 22 disposed thereon between the clamping hole 20 and the leading edge of the base plate. The cable receiving holes 22 are symmetrically aligned with the central axis and are adapted to receive a cable 24. Two guiding holes 26 are disposed in the base plate between the trailing edge of the base plate and the clamping hole 20. The guiding holes 26 are symmetrically aligned with the central axis. Lastly, the base plate includes a rectangular notch 30 disposed thereon adjacent to the leading edge and symmetrically aligned with the central axis. The notch 30 is adapted to guide a cable 24 disposed through the cable receiving holes 22 along an axis that is essentially planar with the central axis.

Operatively associated with the base plate 18 are a pair of essentially rectangular guiding plates 34 having a trailing edge, a leading edge and two side edges. Two guiding holes 36 are disposed therethrough. The guiding plates 34 have a length such that the distance between its trailing edge and leading edge is less than the distance between the trailing edge of the base plate and the corner of the clamping hole adjacent to the trailing edge of the base plate. The guiding plates 34 have a width such that the distance between its side edges is less than the distance between the side edges of the base plate. The guiding holes 36 of the guiding plate 34 and the guiding holes 26 of the base plate 18 have a common axis of symmetry when coupled for operation and use.

Two guiding bolts 40 are provided with cooperative nuts 42. Each bolt 40 is disposed through a guiding hole 26 of the base plate 18 and a guiding hole 34 of the guiding plate 36 and fastened with a nut 42. This effects the coupling the guiding plates 36 to the front and back faces of the base plate 18 and defines a guiding space therebetween. Notches are formed in the two halves of the base plate 18 to form an open V so that the base plate halves may pivot with respect to each other upon loosening the bolts. This allows the mounting of the ball 46 and animal skin prior to operation and use.

A cable 24 is then routed through a cable receiving hole 22 of the base plate from the back to the front face, positioned in the guiding space, routed through the other cable receiving hole 22 of the base plate from the front to the back face, then externally secured, as to a winch of a vehicle for pulling the cable, base plate and hide from the carcass of an animal being skinned. The adjacent cable portions are held together by a sliding cable cinch 54 and crimped cable clamp 56 at a location in proximity to the base plate. Note FIG. 2.

Operatively associated with the clamping hole 20 of the base plate 18 is an essentially spherical ball 46. Ball 46 has a diametric dimension greater than the smallest cross dimension of the clamping hole 20. The ball 46 is adapted to be encompassed with the exposed hide from around the neck of an animal to be skinned. The hide from around the neck is exposed by hanging the animal in an essentially upright position, cutting the hide from around the neck, cutting the hide down the back from the neck to below the hams, then pulling downward. In operation and use, the hide from the carcass is exposed and removed by inserting the hide and ball 46 through the clamping hole 20 of the base plate 18 from the back to the front face. The base plate is then pulled by with a cable 24. This action operates to wedge the hide between the ball and a corner of the clamping hole, particularly the hide in the corner of the clamping hole aligned along the central axis and adjacent to the trailing edge of the base plate. With the hide having been removed, the ball is disassociated from the hide and base plate and the ball and base plate are then ready to be used for removing another hide from another carcass.

Figure 7:
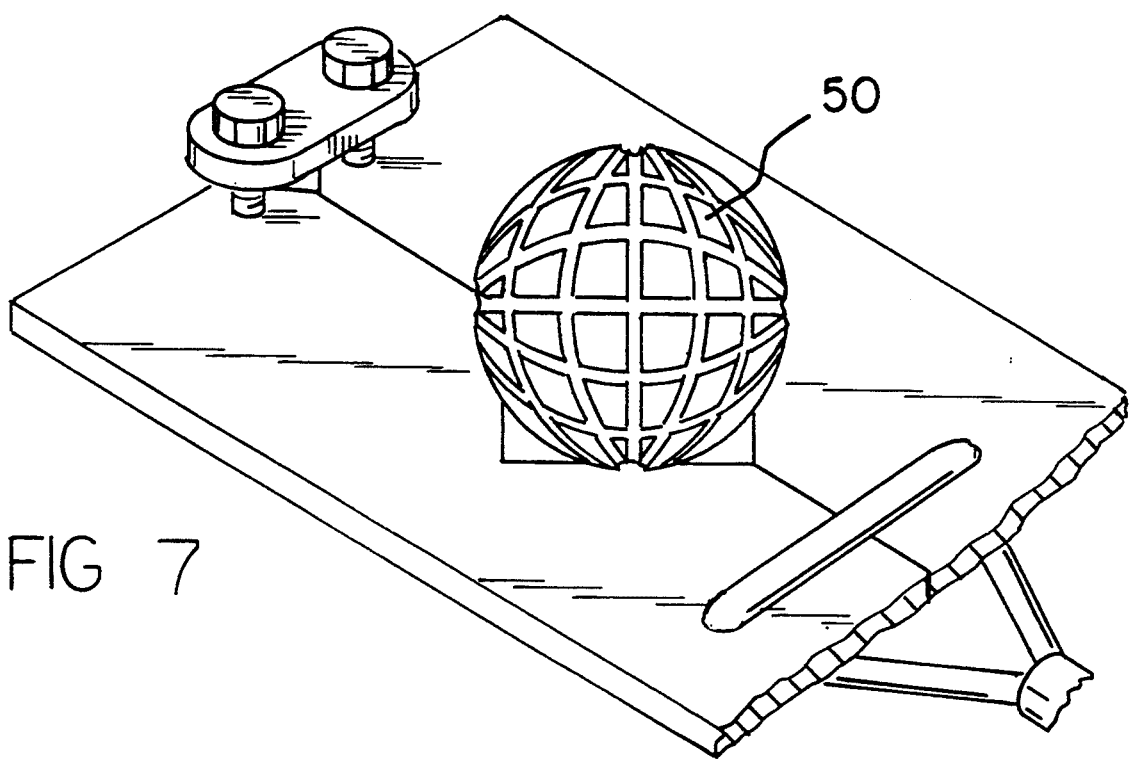
FIG. 7 is a view of a device with a modified ball constructed in accordance with an alternate embodiment of the invention.
Figure 8:
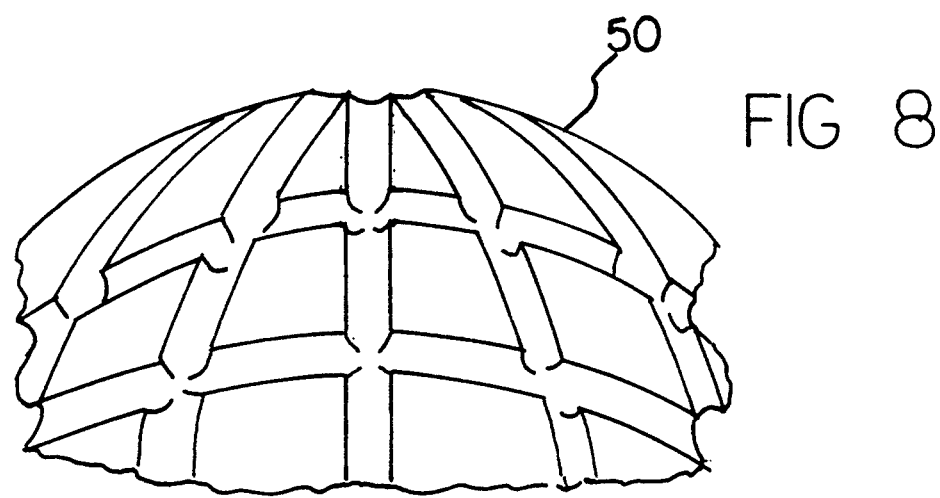
FIG. 8 is an exploded perspective view of the ball and forks of the FIG. 7 embodiment.

FIGS. 7 and 8 illustrate an alternate embodiment of the invention. In accordance with such alternate embodiment, all of the component elements are the same as in the primary embodiments except for the ball 50. In accordance with such alternate embodiment, the ball 50 is provided with grooves 52 in order to more securely keep the hide from slipping when coupled through the clamping hole of the base plate.

In operation and use, the steps to quick-skin big game include: (1) hang deer or any big game by the neck, (2) make a cut around the neck, (3) make a cut down the back from the neck down below the hams, (4) pull skin down on the neck about 6 or 8 inches (enough to hook up the clamp), (5) put the ball under the skin from the inside and clamp the ball with skinning clamp, and (6) tie the other end of the line to any type of motor vehicle and drive forward slowly. The tighter the pull, the tighter the clamp cinches. Note is taken that this procedure can also be done with the carcass on the ground using the same technique.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A device for removing the hide from a carcass of an animal comprising:

a rectangular metal base plate formed of two similarly shaped halves and having a front face, a back face, a leading edge, a trailing edge, two side edges, and a central axis defined from the leading to trailing edge of the base plate, the base plate further including an essentially square clamping hole disposed thereon with the clamping hole having two corners aligned along the central axis, first and second cable receiving holes disposed thereon between the clamping hole and the leading edge of the base plate with the cable receiving holes symmetrically aligned with the central axis and adapted to receive a cable, two guiding holes disposed thereon between the trailing edge of the base plate and the clamping hole with the guiding holes symmetrically aligned with the central axis, and a rectangular notch disposed thereon adjacent to the leading edge and symmetrically aligned with the central axis with the notch adapted to guide a cable disposed through the cable receiving holes along an axis that is essentially planar with the central axis;

a pair of essentially rectangular guiding plates, each having a trailing edge, a leading edge, two side edges, and two guiding holes disposed thereon, the guiding plate having a length such that the distance between its trailing edge and leading edge is less than the distance between the trailing edge of the base plate and the corner of the clamping hole adjacent to the trailing edge of the base plate and having a width such that the distance between its side edges is less than the distance between the side edges of the base plate, the guiding holes of the guiding plate and the guiding holes of the base plate having a common axis of symmetry;

two guiding bolts with cooperative nuts, each bolt disposed through a guiding hole of the base plate and a guiding hole of the guiding plate and fastened with a nut, coupling the guiding plate to the front face of the base plate to define a guiding space therebetween, whereby a cable is routed through a cable receiving hole of the base plate from the back to the front face, positioned in the guiding space, routed through the other cable receiving hole of the base plate from the front to the back face, then externally secured; and an essentially spherical ball having a diametric dimension greater than the smallest cross dimension of the clamping hole and adapted to be encompassed with the exposed hide from around an animal's neck, the hide from around the neck being exposed by hanging the animal in an essentially upright position, cutting the hide from around the neck, cutting the hide down the back from the neck to below the animal's hams, then pulling downward, the hide from the carcass being exposed and removed by inserting the hide and ball through the clamping hole of the base plate from the back to the front face, and pulling the base plate with a cable, wedging the hide between the ball and a corner of the clamping hole, particularly the hide in the corner of the clamping hole aligned along the central axis and adjacent to the trailing edge of the base plate.

2. A device for removing the hide from a carcass of an animal comprising a base plate including a clamping hole disposed thereon, means for securing a cable thereto, a notch disposed thereon for guiding the cable away from the securement means, and means for securing the hide to an externally positioned and prepared animal carcass through the clamping hole of the base plate, so that when the cable is pulled, the hide is torn away from the carcass.

3. The device as set forth in claim 2 wherein the last mentioned means is a ball.

4. The device as set forth in claim 3 wherein the ball is grooved in order to keep the hide from slipping when coupled through the clamping hole of the base plate.

* * * * *